US 11,207,858 B2

(12) United States Patent
Strautmann et al.

(10) Patent No.: US 11,207,858 B2
(45) Date of Patent: Dec. 28, 2021

(54) COMPACTION MATERIAL FEEDING DEVICE FOR A VERTICAL BALING PRESS AND BALING PRESS HAVING A COMPACTION MATERIAL FEEDING DEVICE

(71) Applicant: Strautmann Gépgyártó Hungária Kft, Mátranovák (HU)

(72) Inventors: Wolfgang Strautmann, Bad Laer (DE); Dominik Strautmann, Munster (DE); Philipp Strautmann, Osnabrück (DE)

(73) Assignee: Strautmann Gépgyártó Hungária Kft, Mátranovák (HU)

( * ) Notice: Subject to any disclaimer, the term of this patent is extended or adjusted under 35 U.S.C. 154(b) by 104 days.

(21) Appl. No.: 16/845,279

(22) Filed: Apr. 10, 2020

(65) Prior Publication Data
US 2020/0324500 A1    Oct. 15, 2020

(30) Foreign Application Priority Data
Apr. 15, 2019    (DE) .................... 10 2019 109 899.8

(51) Int. Cl.
*B30B 9/30*    (2006.01)
*B65G 65/23*   (2006.01)

(52) U.S. Cl.
CPC ............ *B30B 9/301* (2013.01); *B30B 9/3014* (2013.01); *B30B 9/3032* (2013.01); *B65G 65/23* (2013.01)

(58) Field of Classification Search
CPC ......... B30B 9/30; B30B 9/301; B30B 9/3014; B30B 9/3032; B30B 15/30; B65G 15/00;
(Continued)

(56) References Cited

U.S. PATENT DOCUMENTS 1,088,100 A * 2/1914 Saunders et al. ....... B60P 1/006
                                                            414/539
2,573,584 A   10/1951 Tourneau
(Continued)

FOREIGN PATENT DOCUMENTS

CA        906830 A      8/1972
CN     206748833 U     12/2017
(Continued)

OTHER PUBLICATIONS

European Search Report for corresponding European Patent Application No. 20168409 dated Oct. 13, 2020.
German Search Report; priority document.

*Primary Examiner* — Jimmy T Nguyen
(74) *Attorney, Agent, or Firm* — Greer, Burns & Crain, Ltd.

(57) ABSTRACT

A compaction material feeding device for a vertical baling press, the compaction material feeding device having a compaction material compartment and a conveyor for feeding compaction material from the compaction material compartment to a loading opening of the associated baling press. In the compaction material feeding device the compaction material compartment is limited by a web-shaped carrier element having side wall segments and having a floor segment, as well as at least two fixed second side walls situated opposite one another. The carrier element can be lifted by a lifter device. In a maximally lifted end position of the carrier element, this element is drawn tight, and a compaction material transfer region of the compaction material feeding device is covered and closed by one of the side wall segments of the carrier element. In addition, a baling press is provided having a compaction material feeding device as described.

20 Claims, 10 Drawing Sheets

(58) Field of Classification Search
CPC ........ B65G 25/08; B65G 29/00; B65G 65/23; B65G 65/34; B65G 65/36; B65D 88/56; B65D 90/205; B65B 69/0083; B02C 18/2241; B02C 18/2266; B02C 18/2275; B02C 18/225
See application file for complete search history.

(56) References Cited

U.S. PATENT DOCUMENTS

| | | | | |
|---|---|---|---|---|
| 3,549,030 | A * | 12/1970 | Burkhalter | B60P 3/41 |
| | | | | 414/537 |
| 8,287,225 | B2 * | 10/2012 | Wahls | B65D 88/56 |
| | | | | 414/420 |
| 8,336,453 | B2 | 12/2012 | Strautmann | |
| 2009/0202325 | A1 | 8/2009 | Wahls | |
| 2020/0039163 | A1 | 2/2020 | Strautmann et al. | |

FOREIGN PATENT DOCUMENTS

| | | |
|---|---|---|
| DE | 1217872 B | 5/1966 |
| DE | 102007013382 A1 | 9/2008 |
| DE | 102007021097 A1 | 9/2008 |
| DE | 202017100780 U1 | 5/2018 |
| DE | 102017108631 A1 | 10/2018 |

\* cited by examiner

COMPACTION MATERIAL FEEDING DEVICE FOR A VERTICAL BALING PRESS AND BALING PRESS HAVING A COMPACTION MATERIAL FEEDING DEVICE

CROSS-REFERENCES TO RELATED APPLICATIONS

This application claims the benefit of the German patent application No. 10 2019 109 899.8 filed on Apr. 15, 2019, the entire disclosures of which are incorporated herein by way of reference.

FIELD OF THE INVENTION

The present invention relates to a compaction material feeding device for a vertical baling press, the compaction material feeding device having a compaction material compartment into which compaction material to be pressed can be placed, and having conveying means by which the compaction material can be removed from the compaction material compartment and can be fed to a loading opening of the associated baling press. In addition, the present invention relates to a baling press having a compaction material feeding device.

BACKGROUND OF THE INVENTION

DE 10 2007 021 097 A1 indicates a press having a loading device, the press being designed, in particular, for compacting compaction material made up of leftover or recycled materials, such as used paper, cardboard boxes, plastic bottles, foils, and the like, and having a press housing that has a pressing chamber therein, having a loading opening for feeding in the compaction material and having a pressing shield that is displaceable in the pressing chamber. Here it is essential that the loading device includes at least one rotor roller that can be driven rotationally and is equipped with conveying prongs, which roller is situated in front of and/or in the loading opening of the press and by whose rotation compaction material can be conveyed from outside the press housing through the loading opening into the pressing chamber. The loading device can have a feeding space connected upstream from the rotor roller into which the compaction material to be pressed can be placed or thrown, and from which the compaction material can be conveyed into the pressing chamber by the rotor roller. In the feeding space, there can be situated a conveyor device with which compaction material placed into the feeding space can be fed to a compaction material reception region of the rotor roller. The feeding space can have a flat floor and the conveyor device can be formed by a conveyor shield that can be displaced in linear fashion in the feeding space by a power drive. Alternatively, the feeding space can have a floor that is curved in the shape of a segment of a cylindrical jacket, and the conveyor device can be formed by a conveyor shield that is pivotable in the feeding space by a power drive, whose pivot axis coincides with a mid-axis of the cylindrical jacket segment. According to further alternatives, the conveyor device can be a system of one or more drivable conveyor chains, or a drivable scraper floor conveyor or drivable conveyor screws.

DE 20 2017 100 780 U1 indicates a compaction material feeding device for a press having a compaction material supply reservoir into which the compaction material to be pressed can be fed, having a rotationally drivable filling rotor situated at an outlet of the compaction material supply reservoir that is at the side of the press in the installed state, and having a conveyor element that can be moved back and forth relative to the filling rotor in the compaction material supply reservoir, the conveyor element having a front surface that faces the filling rotor and feeds the compaction material to the filling rotor, the front surface having a contour whose shape matches an outer circumferential contour of the filling rotor. The compaction material supply reservoir has a floor that is either flat, horizontal, or inclines upward to the filling rotor, and has, as conveyor element, a conveyor slide that can be moved back and forth in linear fashion along the surface of the floor by a power drive, or the compaction material supply reservoir has a floor that has the shape of a lying cylindrical jacket segment and is inclined upward to the filling rotor, and has as conveyor element a conveyor pendulum that can be pivoted back and forth along the surface of the floor by a power drive, a horizontal mid-axis of the floor coinciding with the pivot axis of the conveyor pendulum.

In the known prior art disclosed in the two documents named above, it is regarded as disadvantageous that the compaction material feeding devices are technically complicated and have a relatively large number of components, resulting in high costs for production and a heavy weight of the compaction material feeding devices.

DE 10 2017 108 631 A1 indicates a device for collecting compaction material and for feeding the collected compaction material to a press that presses the compaction material, having at least one movable collection cart that has a collecting space for compaction material to be pressed, and having a compaction material feeding device to which the collection cart can be docked. The collection cart has a floor and a system of wheels on its lower side, as well as at least two side walls situated opposite one another. The compaction material to be pressed can be removed from the collection cart by being lifted upward by the compaction material feeding device, and can be supplied to a compaction compartment or compaction material supply compartment of the press. Here it is essential that a web-shaped, flexible or articulated carrier element having a floor region and having at least two wall regions situated opposite one another, each having an upper free edge, is situated on or in the collection cart, and that in an initial position the carrier element lies on the floor of the collection cart with a U shape running parallel to at least two side walls situated opposite one another and parallel to the floor of the collection cart, or forms at least two side walls situated opposite one another and forms the floor of the collection cart. When the collection cart is docked to the compaction material feeding device, the carrier element can be shortened or lifted by the free edge of at least one of its wall regions for the purpose of lifting the compaction material to be pressed that is situated in the collection cart. For the removal of the compaction material to be pressed from the collection cart, and for the further conveying of the compaction material to be pressed, a system of a plurality, e.g., three or four, supply rollers situated above the collection cart docked to the press is provided, by which the compaction material can be grasped and transported in the direction towards a filling rotor that then finally conveys the compaction material into the pressing chamber of the press.

In this last-described prior art, it is regarded as disadvantageous, in particular, that this solution is directed specifically to an embodiment having one or more movable collection carts, even though in many situations of use of baling presses such collection carts are neither required nor desirable.

SUMMARY OF THE INVENTION

Therefore, for the present invention, an object arises of providing a compaction material feeding device for a vertical baling press that avoids the disadvantages of the prior art and that is, in particular, technically simpler, as well as lighter in weight and lower in cost, and that does not require any collection carts for its operation. In addition, a baling press having a compaction material feeding device is to be indicated.

The solution of the first part of the object, relating to the compaction material feeding device, is achieved according to the present invention by a compaction material feeding device of the type described above that is characterized in that the compaction material compartment is limited by a web-shaped flexible or articulated carrier element that, in an initial position, runs in a U shape, having at least two first side wall segments situated opposite one another and a floor segment, as well as being limited by two fixed second side walls situated opposite one another, and that, for the purpose of conveying the compaction material to be pressed situated in the compaction material compartment to the baling press, the carrier element can be lifted by a lifting device by the end edge of one of its side wall segments, and that, in a maximally lifted end position of the carrier element, this element is drawn tight, and a compaction material transfer region of the compaction material feeding device that faces the loading opening of the baling press when the compaction material feeding device is in use is covered and closed by one of the first side wall segments of the carrier element.

The present invention provides a simple, lightweight, and low-cost compaction material feeding device that is used not only to receive compaction material to be pressed and to supply it to the pressing chamber of the associated baling press, but that also has the function of covering and closing the loading opening to the pressing chamber of the baling press when a pressing process, with a moving press plunger, is carried out in the baling press. Here, a correspondingly positionable wall segment of the carrier element is advantageously used as cover and closure, so that no special additional components are required for this purpose.

In a further embodiment of the compaction material feeding device, it is provided that the carrier element is fixed at two horizontal end edges situated opposite one another, and that, as lifting device, a lifter roller that extends over the width of the carrier element lies against the lower side of the carrier element, which roller can be pivoted by a lifting arm system about a pivot axis that runs parallel to the end edges of the carrier element, below the end edges. The lifting device is thus technically not complex, and due to its simplicity is low in cost and at the same time reliable in its functioning.

It is preferably further provided that the pivot axis of the lifter arm system runs horizontally, as well as substantially vertically, offset downward below the end edge of the carrier element situated closest to the compaction material transfer region of the compaction material feeding device, and that the pivot angle of the lifter arm system is between 80° and 110°, preferably approximately 90° to 100°, and that the lifter arm system can be locked in its maximally lifted pivot position. The relatively small pivot angle requires only a simple, uncomplicated pivot drive. An unintentional removal of the relevant wall segment of the carrier element from its covering and closing position can be reliably prevented by the locking of the system in the maximally lifted pivot position, which corresponds to the position for the covering and closing of the loading opening to the pressing chamber. In this way, the risk of accidents for persons operating the compaction material feeding device and the baling press is minimized.

Preferably, the lifter arm system is provided with at least one power drive, in particular, at least one hydraulic or pneumatic piston-cylinder unit, ensuring reliable operation.

In particular, in order to relieve stress on the carrier element during the receiving of compaction material to be pressed in the compaction material compartment, it is provided that, in addition, fixed first side walls and a fixed floor are situated outside the first side walls formed by the side wall segments of the carrier element and outside the floor, formed by the floor segment, of the compaction material compartment, on which additional fixed side walls and floor the carrier element can be positioned as long as it is not lifted for the purpose of emptying the compaction material compartment.

A development of the compaction material feeding device provides that a front first side wall of the compaction material compartment, facing away from the compaction material transfer region, can be prolonged upward by an additional wall that is variable in height. In this way, the height of the feeding threshold for compaction material to be collected can be adjusted and can be adapted to an already-reached fill level, in order, on the one hand, to enable comfortable manual placement of compaction material, and, on the other hand, to enable the accommodation of as large a volume as possible of compaction material to be pressed.

In order to reinforce and accelerate the filling of the compaction chamber of the associated baling press, an additional conveyor element, in particular a rotor conveyor having a rotationally drivable conveying roller, can be situated on the compaction material feeding device, in the compaction material transfer region.

So that the conveyor roller on the one hand achieves a good conveying effect and, on the other hand, avoids damage, it is useful to provide the conveying roller with outward-pointing, flexible or articulated conveying prongs.

If the above-described pivot movement of the lifter arm system does not by itself achieve an ideal position, required for the closure of the loading opening, of the relevant side wall segment of the carrier element, then the compaction material feeding device can have a positioning mechanism that, when the lifter arm system is in its uppermost end position, can be brought into engagement therewith and/or with the lifting roller, and by which the lifting roller can be adjusted, in order to tighten the carrier element, upward and/or outward towards the compaction material transfer region, into a precise vertical position in which the relevant side wall segment of the carrier element lies tightly against the loading opening and completely covers and closes it.

In order to enable the above-described positioning via the positioning mechanism in as technically simple a manner as possible, it is provided that the lifter arms of the lifter arm system have telescoping end segments that are variable in their length.

The carrier element of the compaction material feeding device preferably comprises a segment of a textile-reinforced plastic or rubber conveyor belt. Such a material is, on the one hand, sufficiently flexible and, on the other hand, sufficiently durable, and is also commercially available at low cost.

The compaction material feeding device can advantageously be produced as a retrofit module in order to be retrofitted to existing baling presses. For this purpose, assembly elements are usefully provided on the compaction material feeding device in order to attach the compaction material feeding device to the baling press, in particular to its pressing chamber door.

Alternatively, it is of course also possible to equip a baling press immediately during its production with the compaction material feeding device according to the present invention.

In order to prevent operating personnel from placing additional compaction material into the compaction material feeding device when the carrier element is lifted for the purpose of transferring compaction material to be pressed into the pressing chamber, in addition, a covering element formed by a flexible or articulated web is provided that is fixed at its one, first end edge to an outer head end of the lifter arm system, and that is led in its course over an upper edge of the front variable-height additional wall facing away from the compaction material transfer region, and that is connected at its other, second end edge to a windup roller pre-loaded in the windup direction, situated on the fixed first side wall remote from the compaction material transfer region.

In order to achieve as long as possible a time of use without damage for the carrier element of the compaction material feeding device, the present invention further provides that in the compaction material transfer region there is situated a carrier element positioning surface that goes out from the lower edge of the transfer region, extends in bent fashion towards the compaction material compartment, and extends downward over part of the height of the compaction material compartment. This carrier element positioning surface can, for example, be a plate having a matching bend, made of metal or plastic, on which the side wall segment of the carrier element closest to the compaction material transfer region is positioned in its initial position, and in this way is supported.

In order to achieve the second part of the object of the invention, relating to the baling press, the present invention provides a baling press having a pressing chamber that has a loading opening for placing compaction material to be pressed into the pressing chamber, and that has a press plunger that is movable in the pressing chamber with a vertical pressing direction, and having a pressing chamber door for removing a finally pressed bale from the pressing chamber.

The advantages explained above are also achieved by the baling press according to the present invention.

In addition, a separating element, formed by a flexible or articulated web, can be provided on the baling press that is fixed at its one, first end edge to a front edge, facing the loading opening of the baling press, of the press plunger, and which is led upward from there and which is connected at its other, second end edge above the loading opening to a windup roller or spring system preloaded in the pull-back direction. The separating element closes the space above the press plunger, and compaction material to be pressed is prevented from undesirably collecting above the press plunger.

In addition, for the baling press it is preferably provided that the compaction material feeding device is situated on the pressing chamber door of the baling press, and, together with the pressing chamber door, is pivotable relative to the rest of the baling press, about a vertical axis. In this way, the fact is taken into account that in most known baling presses the loading opening in the upper part of the pressing chamber door is provided so that the loading opening there can continue to be usable even during the loading of the pressing chamber by the compaction material feeding device.

Finally, for the baling press the present invention provides that, in the maximally raised end position of the carrier element, one of the side wall segments of the carrier element runs substantially parallel to the direction of movement of the press plunger, and covers and closes the loading opening of the baling press. The relevant side wall segment of the carrier element, in its maximally lifted state, thus covers not only the compaction material transfer region of the compaction material feeding device, but at the same time also covers the loading opening of the baling press. Advantageously, a separate door or flap, and an adjustment mechanism therefor, at the loading opening of the baling press are thus not required.

BRIEF DESCRIPTION OF THE DRAWINGS

In the following, exemplary embodiments of the present invention are explained on the basis of the drawing.

In the following description of the figures, identical parts in the various figures of the drawing are always provided with the same reference characters, so that each reference character does not have to be explained again for each figure.

DETAILED DESCRIPTION OF THE PREFERRED EMBODIMENTS

Figure 1:
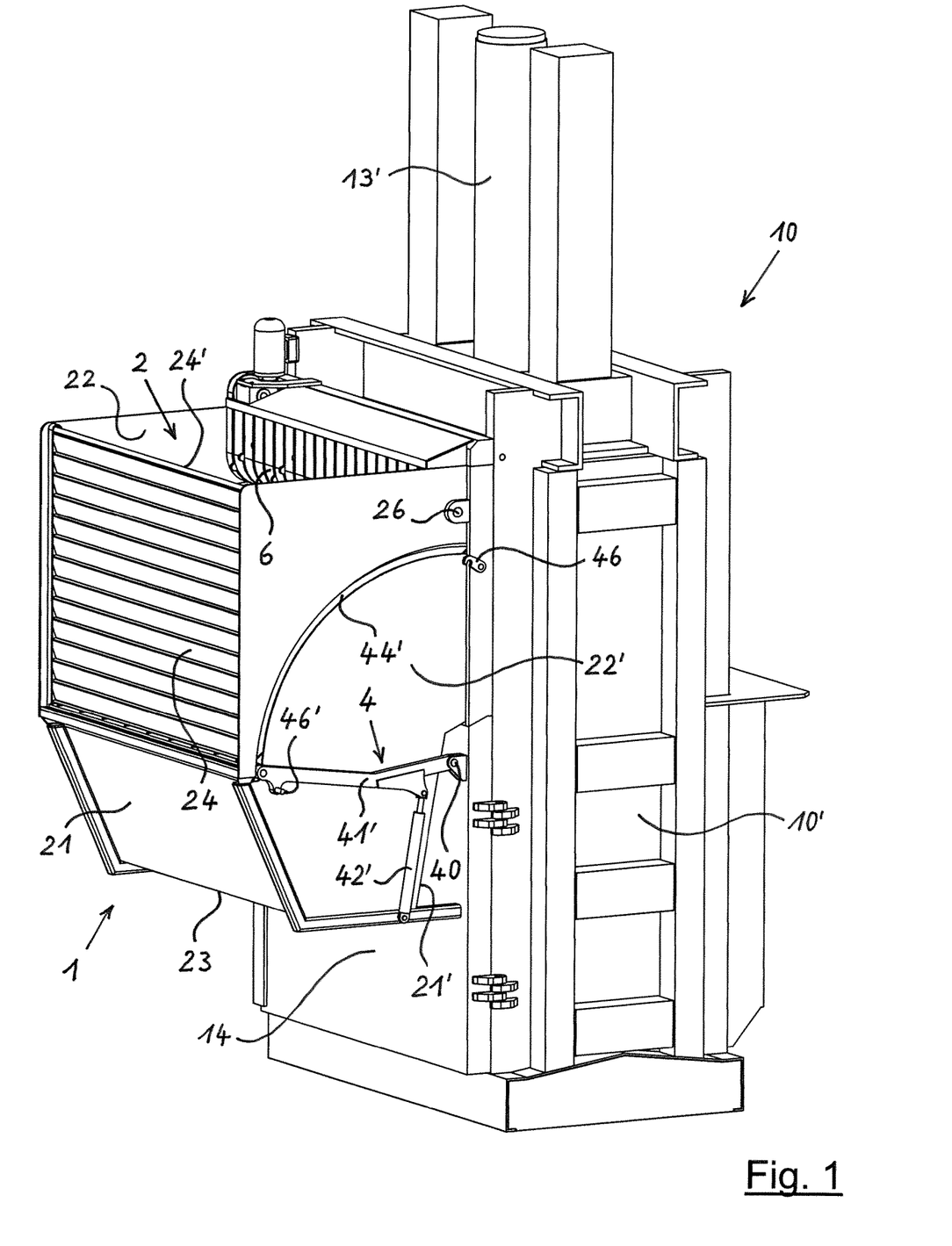
FIG. 1 shows a first compaction material feeding device connected to a vertical baling press, in a first obliquely lateral front view.

FIG. 1 shows a first compaction material feeding device 1, connected to a vertical baling press 10, here to its pressing chamber door 14, in a first obliquely lateral front view.

Compaction material feeding device 1 has a compaction material compartment 2 into which compaction material to be pressed can be placed, and conveyor means by which the compaction material can be removed from compaction material compartment 2 and fed to a loading opening of the associated baling press 10.

Compaction material compartment 2 is open at the top and is laterally limited by fixed first side walls 21, 21' and fixed second side walls 22, 22', and at the bottom by a fixed floor 23. At the front, i.e. at the left in FIG. 1, i.e., at the standardly used compaction material input side, compaction material compartment 2 is limited by a variable-height additional wall 24, such as a curtain that can be rolled up or folded, that extends upward from the upper edge of the (here low) fixed first side wall 21. In the example shown, this additional wall 24 is shown in a position in which its upper edge 24', forming a filling threshold, is in its highest possible position. By shortening additional wall 24, this filling threshold can be lowered to a lower, ergonomically advantageous position that facilitates the filling.

Also visible in FIG. 1 is part of a lifter arm system 4 that is configured symmetrically at both sides of the second fixed side walls 22, 22', immediately external to these. The one lifter arm 41' of lifter arm system 4 runs externally on side wall 22', facing the observer, while second lifter arm 41 is here externally covered by the other second fixed side wall 22. Both lifter arms 41, 41' are pivotable about a common pivot axis 40 by a power drive 42, 42', such as hydraulic piston-cylinder units. In each of the side walls 22, 22' there is provided a lifter arm guide 44, 44', running in a curve over approximately 90°, of which only guide 44' is visible in FIG. 1.

Lifter arms 41, 41' can be detachably locked in their maximally upward-pivoted position by locking elements 46, 46', here in the form of a swivel hook and a bolt.

A lifter roller 43 (here covered and therefore not visible) that runs inside compaction material compartment 2 is connected to the free ends, remote from pivot axis 40, of lifter arms 41, 41' of lifter arm system 4. As is explained in more detail in relation to the further Figures, lifter roller 43 is used to lift a flexible carrier element 3 that in FIG. 1 is situated completely in compaction material compartment 2.

In the upper region of compaction material feeding device 1, a known rotationally drivable conveyor roller is situated on the side of the device facing baling press 10, as an additional conveyor element 6.

Baling press 10 is of a known design and has a stable press housing 10' having a pressing chamber therein in which a press plunger can be moved up and down by a power drive 13', such as a hydraulic piston-cylinder unit.

Assembly elements 26 are used for the easy and fast mechanical connection of compaction material feeding device 1 to pressing chamber door 14 of baling press 10.

Figure 2:
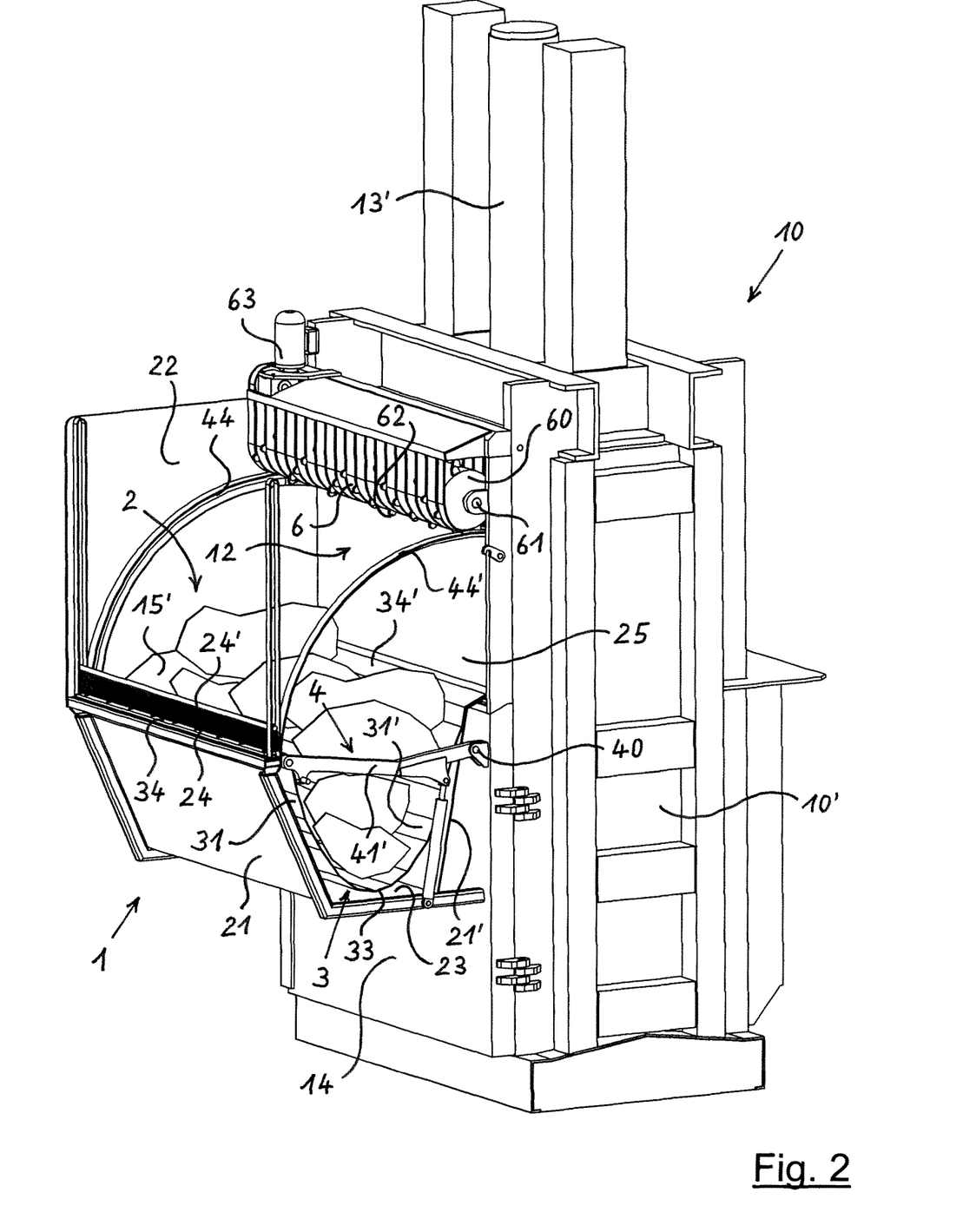
FIG. 2 shows the compaction material feeding device and the baling press in the same view as in FIG. 1, here with partially omitted, partially displaced side walls of the compaction material feeding device, in a lower initial position of a carrier element of the compaction material feeding device.

FIG. 2 shows compaction material feeding device 1 and baling press 10 in the same view as in FIG. 1, now with omitted fixed second side wall 22' and with lowered additional wall 24, in a lower initial position of a carrier element 3 of compaction material feeding device 1.

Compaction material compartment 2 is here limited by the web-shaped flexible or articulated carrier element 3, running in a U shape in its initial position shown in FIG. 2, and having at least two oppositely situated side wall segments 31, 31' and a floor segment 33, as well as by the two fixed second side walls 22, 22' situated opposite one another. Loose pressing material 15' to be pressed, such as cardboard boxes, cardboard, used paper, or empty plastic bottles, is placed into compaction material compartment 2, in particular manually by operating personnel, over upper edge 24' of additional wall 24.

Carrier element 3 is fixed at its one end edge 34 to the upper edge of the low first fixed side wall 21, and at its other end edge 34' is fixed to the lower edge of a compaction material transfer region 25, which is open towards a loading opening 12 of baling press 10, of compaction material feeding device 1.

At the rear, at fixed second side wall 22 situated there, and at the front in FIG. 2, lifter arm guides 44, 44' are visible.

At top on compaction material feeding device 1, there is situated additional conveyor element 6, having conveyor roller 60 equipped with conveyor prongs 62, which can be set into rotation by a geared motor 63.

Figure 3:
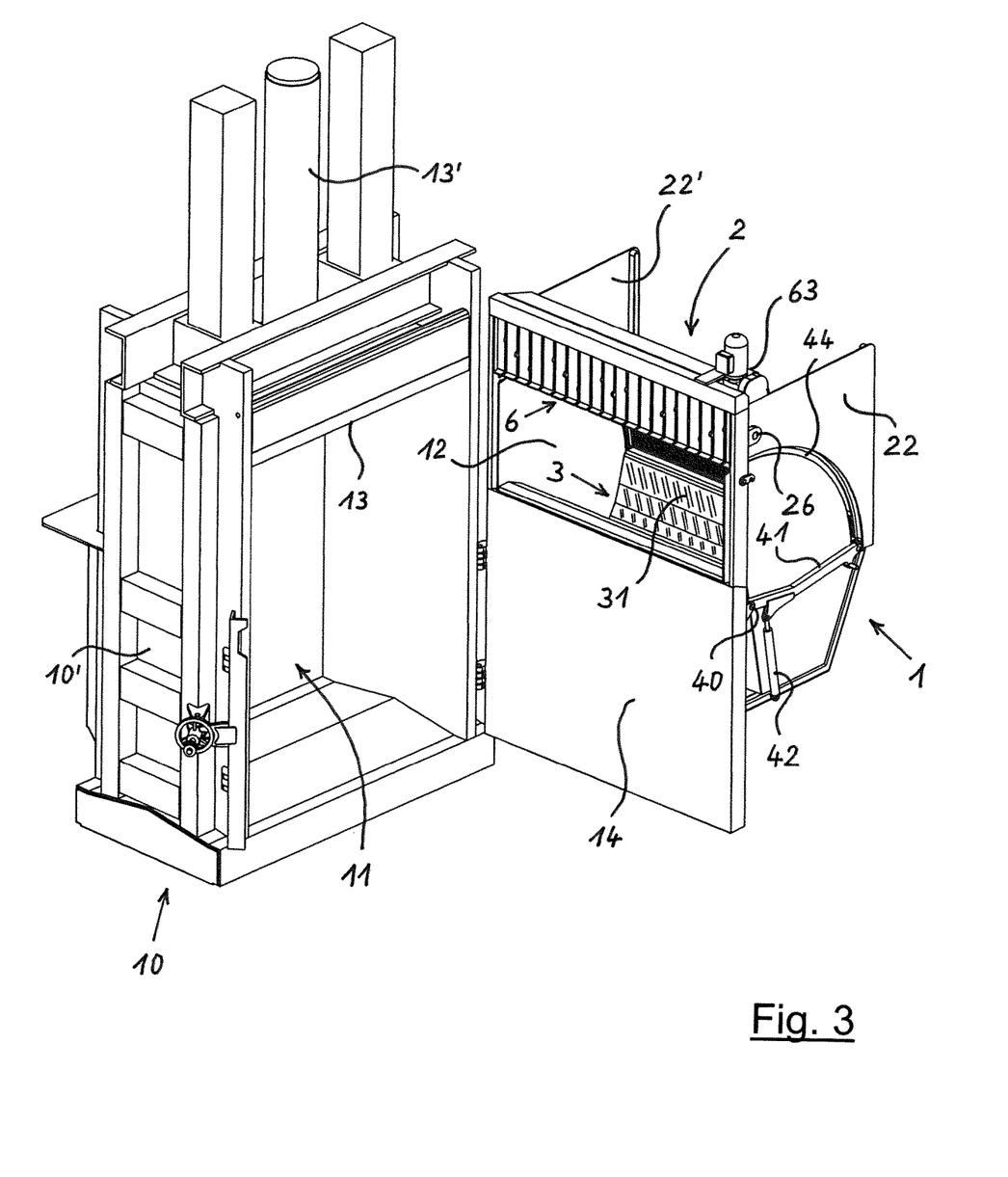
FIG. 3 shows the compaction material feeding device and the baling press, here with an open pressing chamber door, bearing the compaction material feeding device, of the baling press, in a second obliquely lateral front view.

FIG. 3 shows compaction material feeding device 1 and baling press 10, here with open pressing chamber door 14, which bears compaction material feeding device 1, of baling press 10, in a second oblique lateral front view.

Inside pressing housing 10' is situated pressing chamber 11, here open. At top in pressing chamber 11, press plunger 13, here in its uppermost position, is visible. At the upper side on press housing 10', the power drive 13' for the press plunger is visible. The open position of pressing chamber door 14 is used in particular for the removal of a finished pressed bale from pressing chamber 11.

On the side of pressing chamber door 14 here facing away from the observer, compaction material feeding device 1 is situated and is partly covered by pressing chamber door 14. Visible here are the one fixed second side wall 22' and the other fixed second side wall 22, with lifter arm 41 situated there and the associated power drive 42, as well as lifter arm guide 44.

At top in FIG. 3, additional conveyor element 6, with its geared motor 63, is visible through loading opening 12 in pressing chamber door 14. Under it, the one side wall segment 31 of carrier element 3, which is in its initial position, is partly visible.

Figure 4:
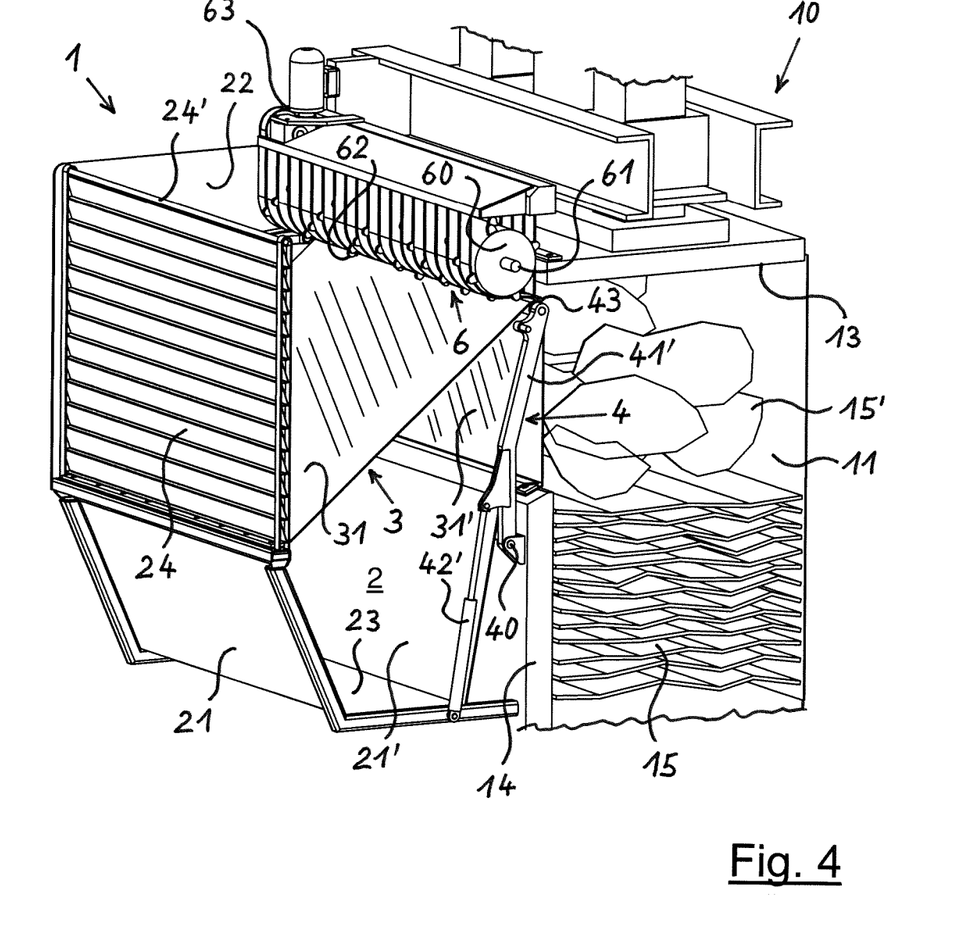
FIG. 4 shows the compaction material feeding device and, in part, the baling press, in the same view as in FIG. 2, with an omitted side wall of the compaction material feeding device, in an upper end position of the carrier element of the compaction material feeding device.

FIG. 4 shows compaction material feeding device 1 and, in part, baling press 10 in the same view as in FIG. 2, with omitted second side wall 22' of compaction material feeding device 1, in an upper end position of carrier element 3 of compaction material feeding device 1.

Starting from the initial position shown in FIG. 2, here carrier element 3 is lifted into the upper end position shown in FIG. 4 by lifter arm system 4 and lifter roller 43 carried by it, for the purpose of feeding the compaction material 15' to be pressed, situated in compaction material compartment 2, to baling press 10. Through this lifting, compaction material 15' to be pressed is gradually conveyed via compaction material transfer region 25 and through loading opening 12 into pressing chamber 11 of baling press 10.

Additional conveyor element 6 supports and accelerates the transfer of compaction material 15' to be pressed into pressing chamber 11.

In the finally reached upper end position of carrier element 3 according to FIG. 4, carrier element 3 is drawn tight and covered, and here, with its side wall segment 31', covers and closes compaction material transfer region 25 of compaction material feeding device 1, and at the same time also covers and closes loading opening 12 of baling press 10.

In pressing chamber 11, in its lower part, the already-compacted pressed compaction material 15 is visible, on which freshly supplied additional pressing material 15' still to be pressed now lies. In the upper end position of carrier element 3 shown in FIG. 4, the press is ready for another pressing stroke of press plunger 13.

Figure 5:
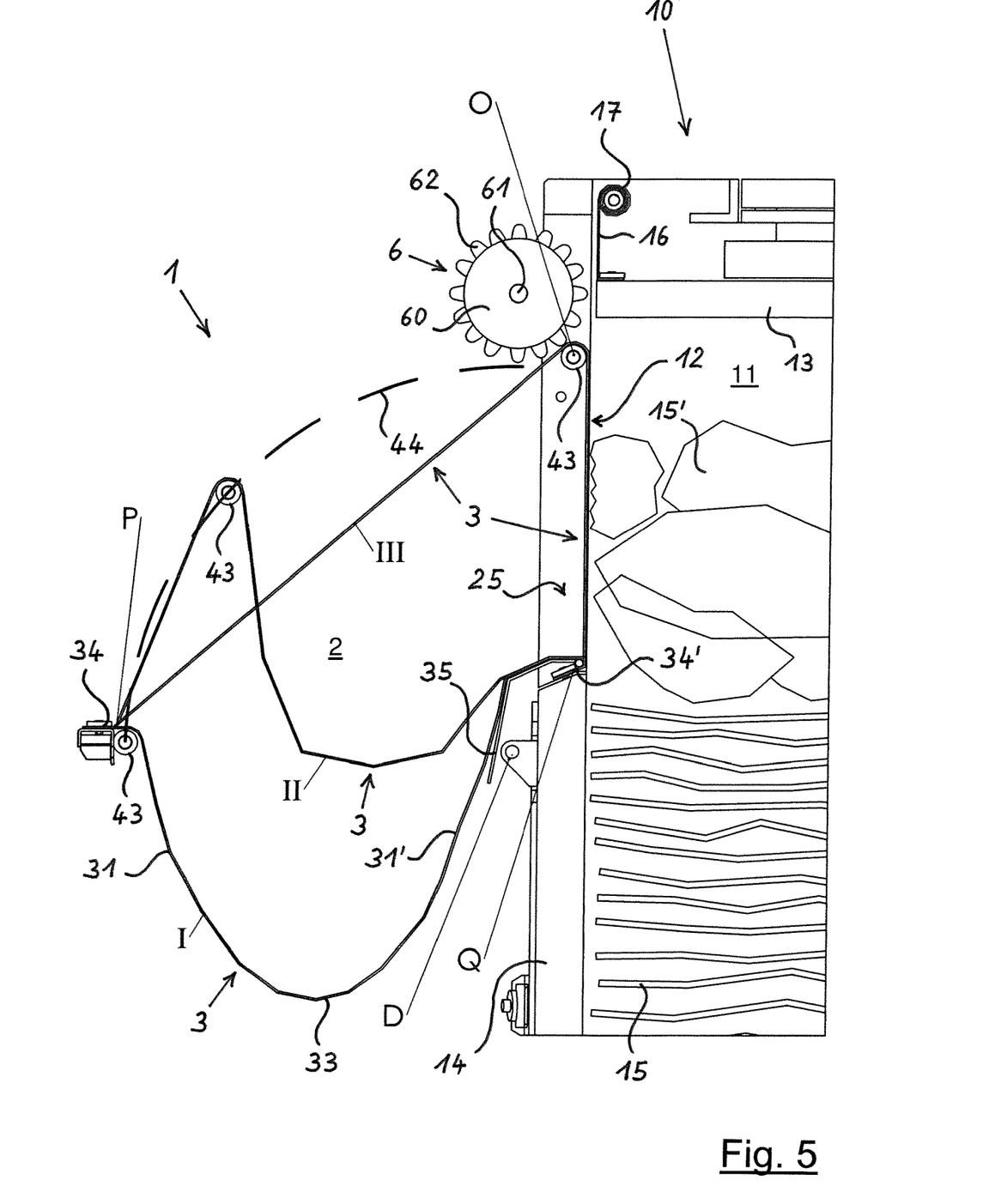
FIG. 5 shows the carrier element and individual further parts of the compaction material feeding device and, in part, the baling press, in three different positions of the carrier element, partly in a side view and partly in vertical section.

FIG. 5 shows compaction material feeding device 1, reduced to carrier element 3 and individual additional parts, and partly shows baling press 10, in three different positions of carrier element 3, partly in a side view and partly in vertical section.

In its lower initial position I, flexible carrier element 3 is in the position in which it limits compaction material compartment 2 at two sides and at the bottom, in the manner of a bag. In this initial position I, compaction material that is later to be pressed can be placed into compaction material compartment 2.

Here, lifter roller 43 of lifter arm system 4 is situated at point P, at which the end edge 34 situated there of carrier element 3 is fixed. The other end edge 34' of carrier element 3 is fixed to the lower edge of compaction material transfer region 25, at point Q.

In the middle intermediate position II, flexible carrier element 3 is lifted a certain distance by lifter arm system 4 and lifter roller 43, and compaction material 15' to be pressed, situated in compaction material compartment 2, is conveyed in the direction towards pressing chamber 11 of baling press 10. In the upper region of compaction material compartment 2, this conveying is supported by the additional conveying element 6, situated in front of loading opening 12 to pressing chamber 11.

In the upper end position III, lifter roller 43 is situated at point O. At this point O, flexible carrier element 3, supported by lifter roller 43 and fixedly clamped at points P and Q, is pulled tight.

In this upper end position III, the surface of carrier element 3 situated at pressing chamber 11 is flat, and extends parallel to the direction of movement of press plunger 13 in a substantially vertical plane, and at a distance from the front edge of press plunger 13, which faces compaction material feeding device 1, that remains constant during the movement of press plunger 13 from its upper position to its lower position.

The pivoting of lifter arms 41, 41' (not shown here) of lifter arm system 4 here takes place about point D, which corresponds to the position of pivot axis 40. Lifter roller 43 moves along the curve indicated in FIG. 5 by a dashed line, which corresponds to the course of lifter arm guides 44, 44'.

In addition, FIG. 5 shows a separating element 16, assigned to baling press 10 in its upper region. Separating element 16 is here formed by a flexible or articulated web that is fixed at its one first end edge to the front edge, facing loading opening 12 of baling press 10, of press plunger 13, and which is guided upward from there and which is connected at its upper, second end edge above loading opening 12 to a windup roller 17 whose position is fixed and that is preloaded in the pull-back direction. When press plunger 13 is lowered, it pulls separating element 16 downward with it, and in this way closes loading opening 12 of pressing chamber 11 when press plunger 13 moves downward and is in a lowered position.

A carrier element positioning surface 35 that extends in bent fashion towards compaction material compartment 2 and extends downward over a part of the height of compaction material compartment 2 goes out from the lower edge of compaction material transfer region 25, on which positioning surface carrier element 3 can be positioned in its initial position and in intermediate positions.

Figure 6:
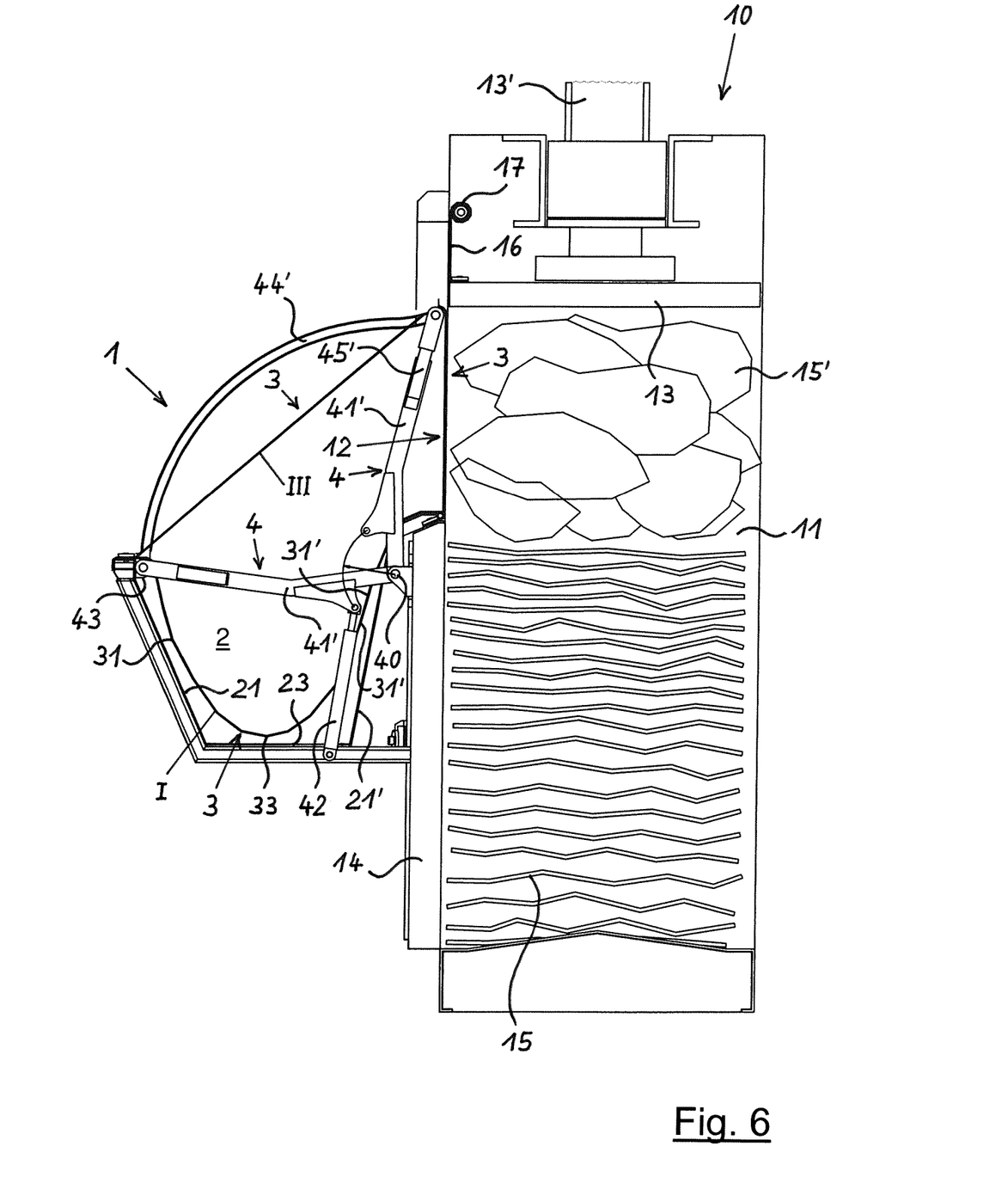
FIG. 6 shows a second compaction material feeding device and a baling press having this device, with an omitted side wall of the compaction material feeding device, with the lower initial position and the upper end position of the carrier element of the compaction material feeding device, partly in a side view and partly in vertical section.

FIG. 6 shows a second compaction material feeding device 1 and a baling press 10 having this device, with omitted second side walls 22, 22' of compaction material feeding device 1, with lower initial position I and upper end position III of carrier element 3 of compaction material feeding device 1, partly in a side view and partly in vertical section.

Differing from the first exemplary embodiment described above, here compaction material feeding device 1 according to FIG. 6 does not have an additional conveying element. The feeding of compaction material 15' to be pressed from compaction material compartment 2 of compaction material feeding device 1 into pressing chamber 11 of baling press 10 thus takes place here solely through the lifting of flexible carrier element 3.

In initial position I, carrier element 3 forms, with its side wall segments 31, 31' and its floor segment 33, two lateral limitations and the lower limitation of compaction material compartment 2. Two further lateral limitations of compaction material compartment 2 are formed by the second fixed side walls 22, 22' (not shown here).

Through the pivoting of lifter arm system 4 in the clockwise direction by approximately 90° upward, carrier element 3 is brought into its upper end position III, in which it is drawn tight and on the one hand closes loading opening 12 to pressing chamber 11 of baling press 10, and on the other hand, with its outward-oriented region pointing away from baling press 10, prevents the introduction of compaction material to be pressed.

Through the repeated introduction of compaction material 15' to be pressed into pressing chamber 11, and correspondingly repeated movement of press plunger 13 downward, a bale of pressed compaction material 15 is gradually formed in pressing chamber 11. In its finally pressed state, the bale of pressed compaction material 15 can be removed from pressing chamber 11 after opening pressing chamber door 14; usefully, before this a binding of the pressed bale can take place in pressing chamber 11 in a known manner.

Figure 7:
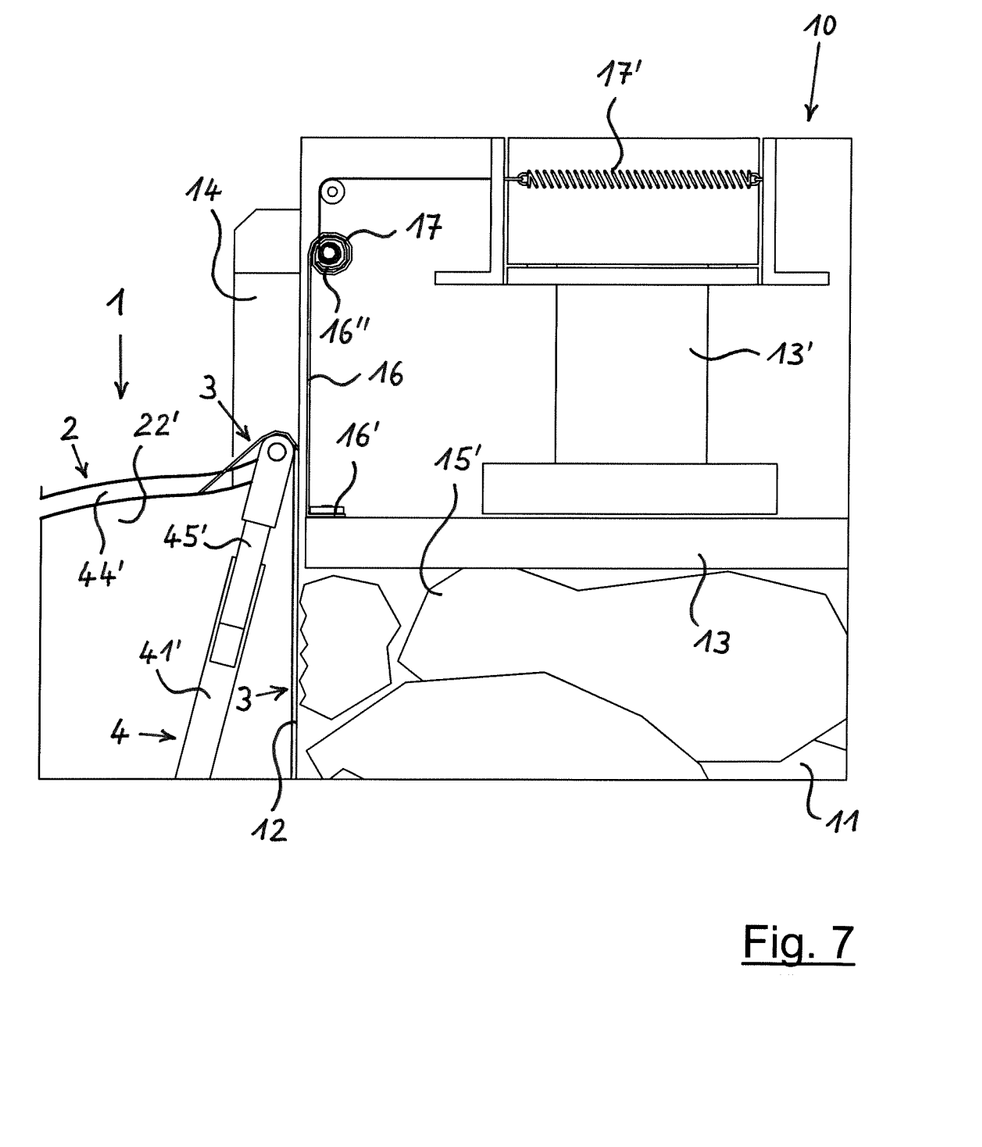
FIG. 7 shows an enlarged segment of the upper region of the compaction material feeding device and baling press of FIG. 6, partly in a side view and partly in vertical section.

FIG. 7 shows an enlarged segment of the upper region of compaction material feeding device 1 and baling press 10 of FIG. 6, partly in a side view and partly in vertical section.

Here, press plunger 13 is shown in its movement from its upper end position, corresponding to a filling position, in the direction towards its lower end position, which can be situated at different heights corresponding to the already-reached fill level of pressing chamber 11.

At the left, above press plunger 13, separating element 16, which can be rolled up, for example a flexible fabric, can be seen, attached with its lower end edge 16' at the upper side to the front (i.e., left in FIG. 7) edge of press plunger 13. Second end edge 16" of separating element 16 is connected to windup roller 17, which is situated in positionally fixed fashion above loading opening 12 on housing 10' of baling press 10.

When press plunger 13 is lowered by its power drive 13', separating element 16 is correspondingly unrolled. The unrolling movement tensions a spring 17' that, when press plunger 13 moves upward, brings it about that windup roller 17, to which the second end edge 16" of separating element 16 is connected, is set into a winding-up movement, and rolls up separating element 16.

If compaction material 15' to be pressed is not caught by press plunger 13 during its downward movement, then this compaction material 15' remains suspended between separating element 16 and the segment of carrier element 3 covering loading opening 12, and cannot move in an undesirable manner into the space forming above press plunger 13, where compaction material could interfere with the operation of baling press 10.

FIG. 7 also shows that lifter roller 43 is led upward into its end position via the upward-pointing guide 44', in order to pull carrier element 3 tight.

Figure 8:
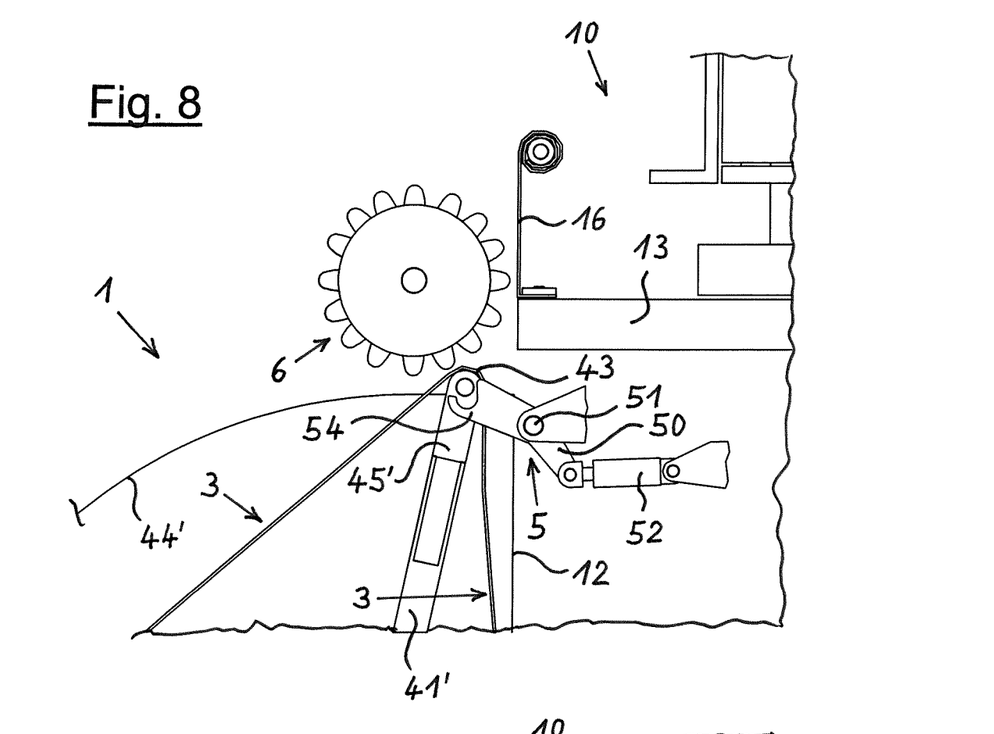
FIG. 8 shows a third compaction material feeding device and a baling press having this device, in an enlarged segment of its upper region, in a first functional state, partly in a side view and partly in vertical section.

FIG. 8 shows a third compaction material feeding device 1 and a baling press 10 having this device, in an enlarged segment of its upper region, in a first functional state, partly in a side view and partly in vertical section. This third compaction material feeding device 1 is again equipped with an additional conveyor element 6 of the type described above.

In addition, compaction material feeding device 1 has a positioning mechanism 5 that is used to position lifter roller 43 in its upper end position relative to loading opening 12 in a precise manner, in such a way that the segment located there of carrier element 3 covers and closes loading opening 12 as tightly as possible. For this purpose, positioning mechanism 5 has a lever arm 50 that is pivotable about a pivot axis 51 that appertains to baling press 10 and that runs horizontally and perpendicular to the plane of the drawing of FIG. 8. A power drive 52, here in the form of a pneumatic or hydraulic piston-cylinder unit, engages with the one, lower end of lever arm 50. An engaging fork 54 that is upwardly open is integrally formed on the other end of lever arm 50.

Lifter arms 41, 41' of lifter arm system 4 here have telescoping end segments 45, 45', on whose outer end lifter roller 43 is rotatably mounted by bearing pins that extend axially outward, in each case past end segments 45, 45'. Lifter arm guide 44' for lifter arm 41', visible in FIG. 8, is indicated here by a simple curved line.

In the state shown in FIG. 8, engaging fork 54 is not in engagement with end segment 45' of lifter arm 41'. Lifter roller 43 is still at a certain horizontal distance from the plane of loading opening 12, and the segment of carrier element 3 running close to loading opening 12 correspondingly still has a certain distance from the plane of loading opening 12.

Figure 9:
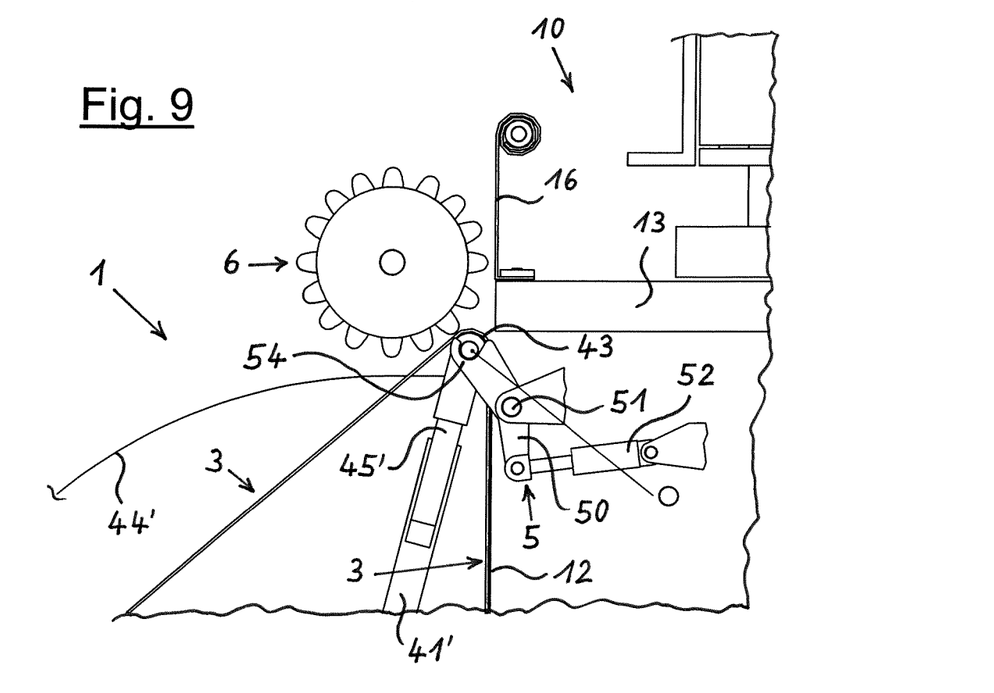
FIG. 9 shows the compaction material feeding device and the baling press in the same view as in FIG. 8, here in a second functional state.

FIG. 9 shows compaction material feeding device 1 and baling press 10 in the same representation as in FIG. 8, here in a second functional state. In this second functional state, actuation of power drive 52 causes lever arm 50 to pivot in the clockwise direction, and as a result engaging fork 54 moves into engagement with end segment 45' and with the bearing pin situated there of lifter roller 43. Symmetrically to this, the same process takes place at the other side of the compaction material compartment. As a result, lifter roller 43 is brought into the position visible in FIG. 9, in which the segment of carrier element 3 running vertically downward from lifter roller 43 tightly covers and closes loading opening 12 of baling press 10.

Figure 10:
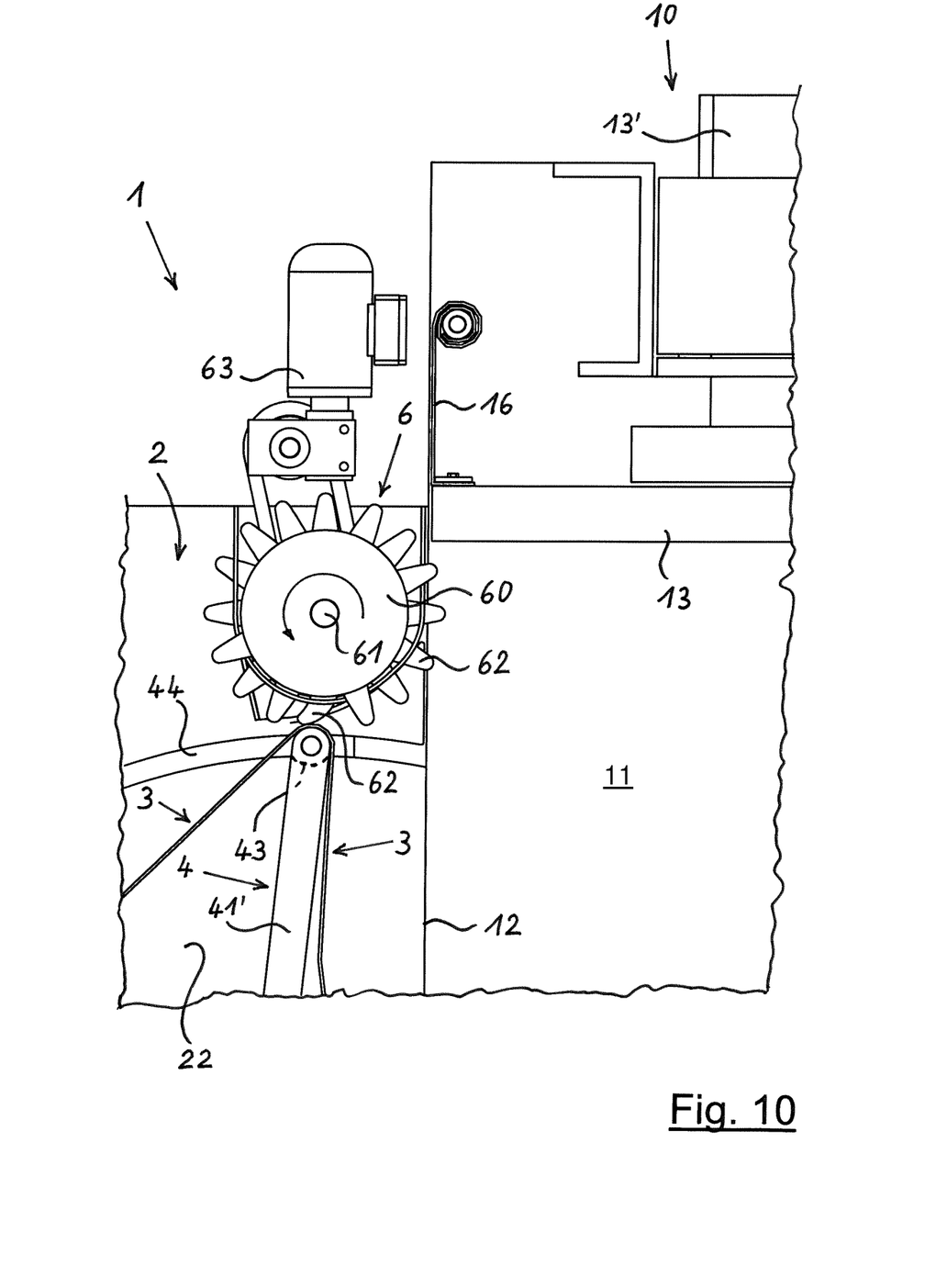
FIG. 10 shows a fourth compaction material feeding device and a baling press having this device, in an enlarged segment of its upper region, partly in a side view and partly in vertical section.

FIG. 10 shows a fourth compaction material feeding device 1 and a baling press 10 having this device, in an enlarged segment of its upper region, partly in a side view and partly in vertical section.

This compaction material feeding device 1 again has an additional conveying element 6 in the form of a conveyor roller 60 driven by a geared motor 63, which, through its rotation, conveys the compaction material to be pressed, lifted by lifter arm system 4 in carrier element 3, into pressing chamber 11 of baling press 10, situated below press plunger 13.

Differing from the previously described exemplary embodiments of compaction material feeding devices 1, here conveyor roller 60 is equipped with flexible conveyor prongs 62, for example made of plastic, such as polyurethane (PUR). These flexible conveyor prongs 62 can therefore be situated in the region of movement of the other working tools of compaction material feeding device 1 and/or of baling press 10, and can yield to these without damage.

Figure 11:
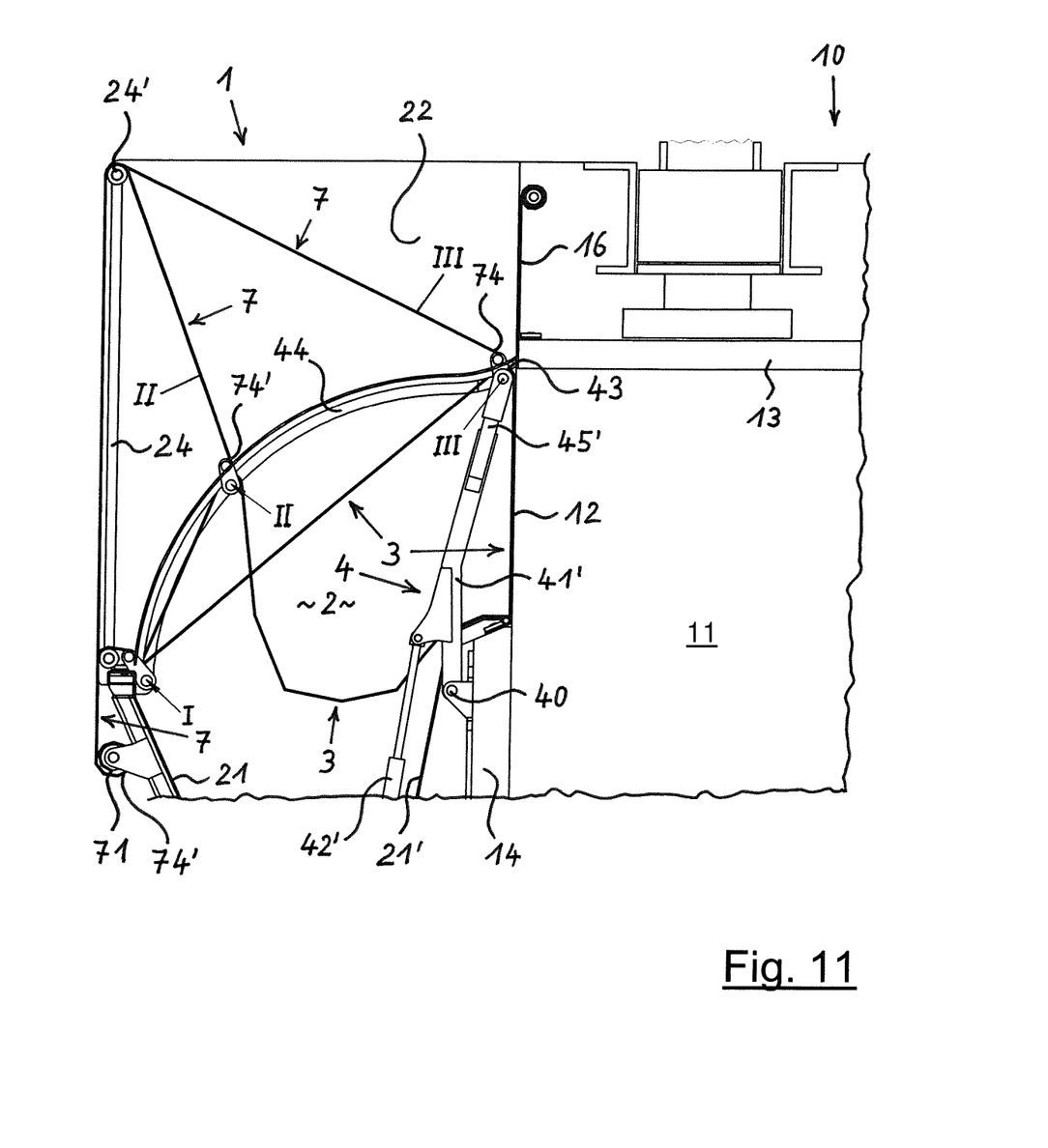
FIG. 11 shows a fifth compaction material feeding device and a baling press having this device, in an enlarged segment of its upper region, with a middle, intermediate position and the upper, end position of the carrier element and of an additional covering element of the compaction material feeding device, partly in a side view and partly in vertical section.

Finally, FIG. 11 shows a fifth compaction material feeding device 1 and a baling press 10 having this device, in an enlarged segment of its upper region, with middle intermediate position II and upper end position III of carrier element 3 and of an additional cover element 7 of compaction material feeding device 1, partly in a side view and partly in vertical section.

In this embodiment of compaction material feeding device 1, the additional covering element 7 is provided, for example in the form of a flexible fabric, which, during the movement of lifter roller 43 and the lifting and tightening thereby brought about of flexible carrier element 3, prevents compaction material to be pressed from falling out of compaction material compartment 2 into the space that forms here between the front (at left in FIG. 11) limitation of compaction material compartment 2 and the lifted carrier element 3, which is in its upper end position.

For this purpose, covering element 7 is fixed at its one, first end edge 74 to an outer head end of lifter arm system 4, and in its further course is led over the upper edge 24' of the front variable-height additional wall 24 facing away from compaction material transfer region 25, and is fixed at its other, second end edge 74' to a windup roller 71 that is preloaded in the windup direction, which is connected to the fixed first side wall 21 situated remote from the compaction material transfer region 25.

When lifter arm system 4 is lifted, covering element 7 is also pulled tight, as is carrier element 3, by its movement, and the covering element then assumes the position shown in FIG. 11 as position III, in which it covers compaction material space 2.

During the filling of compaction material compartment 2 with compaction material to be pressed, flexible covering element 7 hangs down loosely on the side facing baling press 10 of first fixed side wall 21 of compaction material compartment 2, where it does not present a disturbing appearance.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE CHARACTERS 1 compaction material feeding device
10 baling press
10' press housing
11 pressing chamber
12 loading opening
13 press plunger
13' power drive for 13
14 pressing chamber door
15 pressed compaction material
15' loose compaction material
16 separating element
16', 16" end edges of 16
17 windup roller for 16
17' preloading spring for 17
2 compaction material compartment
21, 21' first fixed side walls
22, 22' second fixed side walls
23 fixed floor
24 variable-height additional wall over 21
24' upper edge of 24
25 compaction material transfer region
26 assembly elements
3 carrier element
31, 31' side wall segments of 3
33 floor segment of 3
34, 34' end edges of 3
35 carrier element positioning surface
4 lifter arm system
40 pivot axis
41, 41' lifter arms
42, 42' power drives for 41, 41'
43 lifter roller
44, 44' lifter arm guides on 22, 22'
45, 45' telescoping end segments of 41, 41'
46, 46' locking elements
5 positioning mechanism
50 lever arm
51 pivot axis of 50
52 power drive on 5
54 engaging fork on 50
6 additional conveyor element
60 conveyor roller
61 axis of rotation of 60
62 conveyor prongs
63 geared motor
7 covering element
71 windup roller for 7
74, 74' end edges of 7
I lower initial position of 3
II middle intermediate position of 3
III upper end position of 3
D linkage point for 41, 41'
O upper end position of 43
P fixing point of 34
Q fixing point of 34'

The invention claimed is:

1. A compaction material feeding device for a vertical baling press, the compaction material feeding device comprising:
a compaction material compartment into which compaction material that is to be pressed can be placed, and
conveyor means configured to remove the compaction material from the compaction material compartment and feed the compaction material from the compaction material compartment to a loading opening of the baling press,
wherein the compaction material compartment is limited by a web-shaped flexible or articulated carrier element that, in an initial position, runs in a U shape, the carrier element having at least two first side wall segments situated opposite one another and a floor segment, the compaction material compartment is further limited by at least two fixed second side walls situated opposite one another for guiding the carrier element,
wherein, for feeding the compaction material to be pressed that is situated in the compaction material compartment to the baling press, using a lifter device, the carrier element is configured to be lifted by an end edge of one of the first side wall segments,
wherein, in a maximally lifted end position of the carrier element, the carrier element is drawn tight to allow one of the first side wall segments of the carrier element to cover and close both of a compaction material transfer region of the compaction material feeding device and the loading opening, and
wherein said compaction material transfer region faces the loading opening of the baling press.

2. The compaction material feeding device as recited in claim 1, wherein the carrier element is fixed to two horizontal end edges situated opposite one another, and wherein, as the lifter device, a lifter roller that extends over a width of the carrier element lies on an underside of the carrier element, which lifter roller is movable, by a lifter arm system, about a pivot axis that runs parallel to the end edges of the carrier element.

3. The compaction material feeding device as recited in claim 2, wherein the pivot axis of the lifter arm system runs horizontally as well as vertically offset downward below the end edge, closest to the compaction material transfer region of the compaction material feeding device,
wherein a pivot angle of the lifter arm system is between 80° and 110°, and
wherein the lifter arm system is configured to be lockable in its maximally lifted pivot position.

4. The compaction material feeding device as recited in claim 2, wherein at least one power drive is allocated to the lifter arm system.

5. The compaction material feeding device as recited in claim 4, wherein the at least one power drive comprises at least one hydraulic or pneumatic piston-cylinder unit.

6. The compaction material feeding device as recited in claim 1, wherein, in addition, fixed first side walls and a fixed floor are situated outside the first side wall segments of the carrier element in the initial position and outside the floor segment.

7. The compaction material feeding device as recited in claim 1, wherein a fixed first side wall, facing away from the compaction material transfer region, of the compaction material compartment is capable of being prolonged upward by an additional wall whose height is variable.

8. The compaction material feeding device as recited in claim 1 wherein an additional conveyor element is situated in the compaction material transfer region.

9. The compaction material feeding device as recited in claim 8, wherein the additional conveyor element comprises a rotor conveyor having a rotationally drivable conveyor roller.

10. The compaction material feeding device as recited in claim 9, wherein the conveyor roller is provided with outward-pointing flexible or articulated conveyor prongs.

11. The compaction material feeding device as recited in claim 2, further comprising a positioning mechanism that, when the lifter arm system is in an uppermost end position, can be brought into engagement with the lifter roller, and by which the lifter roller, in order to tighten the carrier element, can be adjusted into a precise vertical position, in a direction of at least one of upward or outward towards the compaction material transfer region.

12. The compaction material feeding device as recited in claim 11, wherein lifter arms of the lifter arm system have telescoping end segments whose length is adjustable.

13. The compaction material feeding device as recited in claim 1, wherein the carrier element comprises a segment of a textile-reinforced plastic or rubber conveyor belt.

14. The compaction material feeding device as recited in claim 1, wherein assembly elements are provided thereon for attaching the compaction material feeding device to the baling press.

15. The compaction material feeding device as recited in claim 7, further comprising a covering element formed by a flexible or articulated web being provided that is fixed at one, first end edge to an outer head end of the lifter arm system and that is led in a course over an upper edge of the variable-height additional wall facing away from the compaction material transfer region, and that is connected at its other, second end edge to a windup roller that is preloaded in a windup direction, situated at a fixed first side wall remote from the compaction material transfer region.

16. The compaction material feeding device as recited in claim 1, wherein in the compaction material transfer region there is situated a carrier element positioning surface that goes out from a lower edge of the transfer region, extending in bent fashion towards the compaction material compartment and extending downward over a part of a height of the compaction material compartment.

17. A baling press comprising:
a pressing chamber,
a loading opening for the introduction of compaction material that is to be pressed into the pressing chamber,
a press plunger that is movable in the pressing chamber with a vertical pressing direction,
a pressing chamber door for removing a finally pressed bale from the pressing chamber, and
a compaction material feeding device comprising a compaction material compartment into which compaction material that is to be pressed can be placed, and conveyor means configured to remove the compaction material from the compaction material compartment and feed the compaction material from the compaction material compartment to the loading opening of the baling press,
wherein the compaction material compartment is limited by a web-shaped flexible or articulated carrier element that, in an initial position, runs in a U shape, the carrier element having at least two first side wall segments situated opposite one another and a floor segment, the compaction material compartment is further limited by at least two fixed second side walls situated opposite one another for guiding the carrier element,
wherein, for feeding the compaction material to be pressed that is situated in the compaction material compartment to the baling press, using a lifter device, the carrier element is configured to be lifted by an end edge of one of the first side wall segments,
wherein, in a maximally lifted end position of the carrier element, the carrier element is drawn tight to allow one of the first side wall segments of the carrier element to cover and close both of a compaction material transfer region of the compaction material feeding device and the loading opening, and
wherein said compaction material transfer region faces the loading opening of the baling press.

18. The baling press as recited in claim 17, wherein a separating element formed by a flexible or articulated web is provided that is fixed at one, first end edge to a front edge, facing the loading opening of the baling press, of the press plunger, and which is led upward from there and which is connected at its other, second end edge above the loading opening to a windup roller or spring system that is preloaded in a pull-back direction.

19. The baling press as recited in claim 17, wherein the compaction material feeding device is situated on the pressing chamber door of the baling press and is pivotable together with the pressing chamber door relative to a rest of the baling press, about a vertical axis.

20. The baling press as recited in claim 17, wherein in the maximally lifted end position of the carrier element, one of the front side wall segments of the carrier element runs parallel to a direction of movement of the press plunger, and covers and closes the loading opening of the baling press.

\* \* \* \* \*